United States Patent [19]

Hintsa

[11] Patent Number: 4,907,637
[45] Date of Patent: Mar. 13, 1990

[54] FABRIC MOUNTING SYSTEM

[75] Inventor: R. Albert Hintsa, Woodbridge, Canada

[73] Assignee: Decoustics Limited, Rexdale, Canada

[21] Appl. No.: 917,604

[22] Filed: Oct. 10, 1986

[51] Int. Cl.⁴ .............................................. E06B 3/00
[52] U.S. Cl. .................................. 160/368.1; 160/327; 24/460; 24/543
[58] Field of Search .................... 160/368 R, 378, 380, 160/327, 328; 52/222, 202; 24/460, 462, 543, 563; 269/254 R

[56] References Cited

U.S. PATENT DOCUMENTS

| | | | |
|---|---|---|---|
| 3,529,653 | 9/1970 | Fey, Jr. ........................... | 160/378 X |
| 3,841,047 | 10/1974 | Zinn ................................ | 52/732 |
| 3,934,365 | 1/1976 | Stein et al. ..................... | 160/378 X |
| 4,333,284 | 6/1982 | Meadows ....................... | 160/368 R X |
| 4,341,255 | 7/1982 | Mock .............................. | 160/368 R X |
| 4,403,642 | 9/1983 | Morris ............................ | 160/328 X |
| 4,472,862 | 9/1984 | Bloomfield et al. ........... | 24/460 |
| 4,566,236 | 1/1986 | Pound ............................ | 160/380 X |
| 4,631,882 | 12/1986 | Sease ............................. | 52/222 |

*Primary Examiner*—Blair M. Johnson

[57] ABSTRACT

A fabric mounting system for securing a fabric or other flexible sheet material to provide a facing and/or partition is disclosed. A support or mounting member is first secured on an existing wall, ceiling or other location. Fabric engaging strips, having slots therein, receive a fold of fabric within the slot and the fabric is wrapped about the strips to cover the strip and position the raw edge of fabric interior to the periphery of the system. Each strip is then brought into engagement with a mounting member such that a portion of the mounting member is inserted in the slot to lock the strip and fabric in place, preferably due to an interference fit.

20 Claims, 3 Drawing Sheets

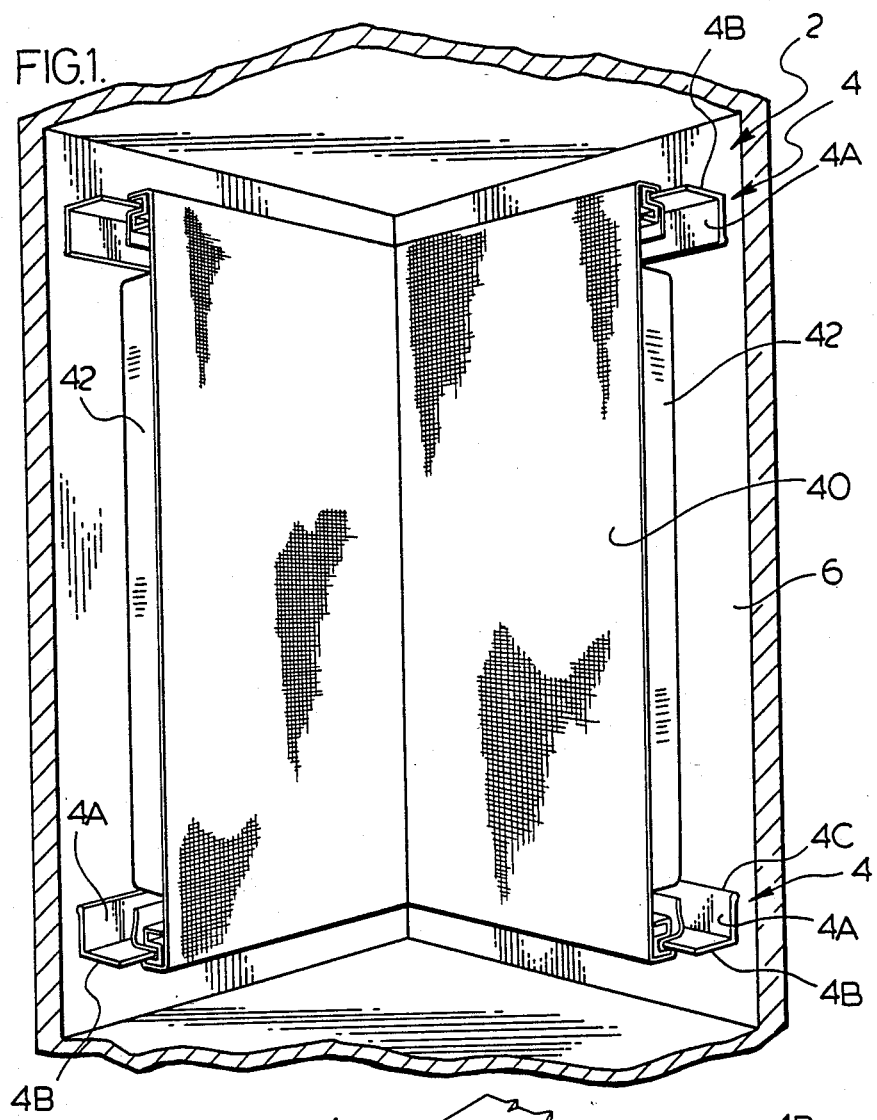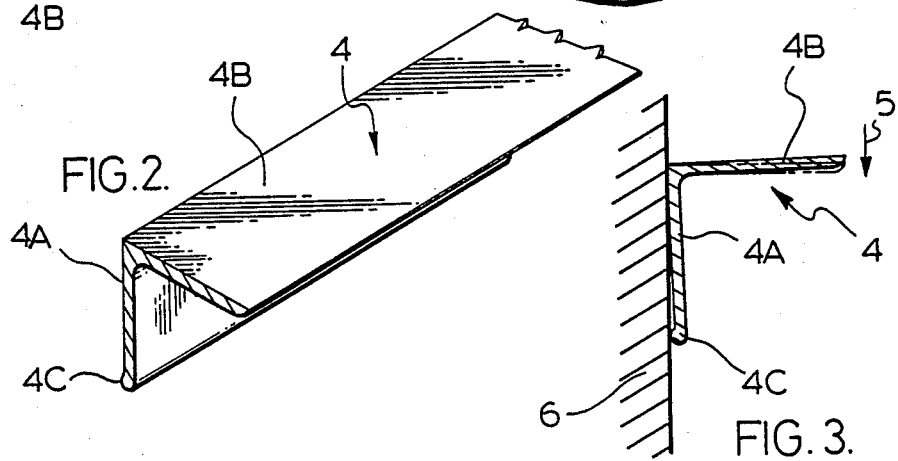

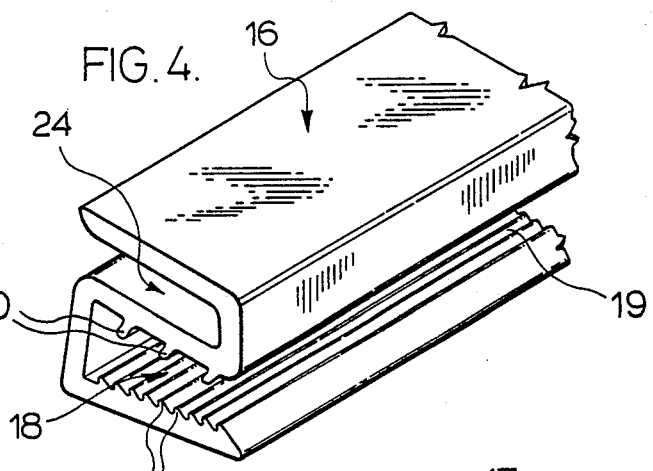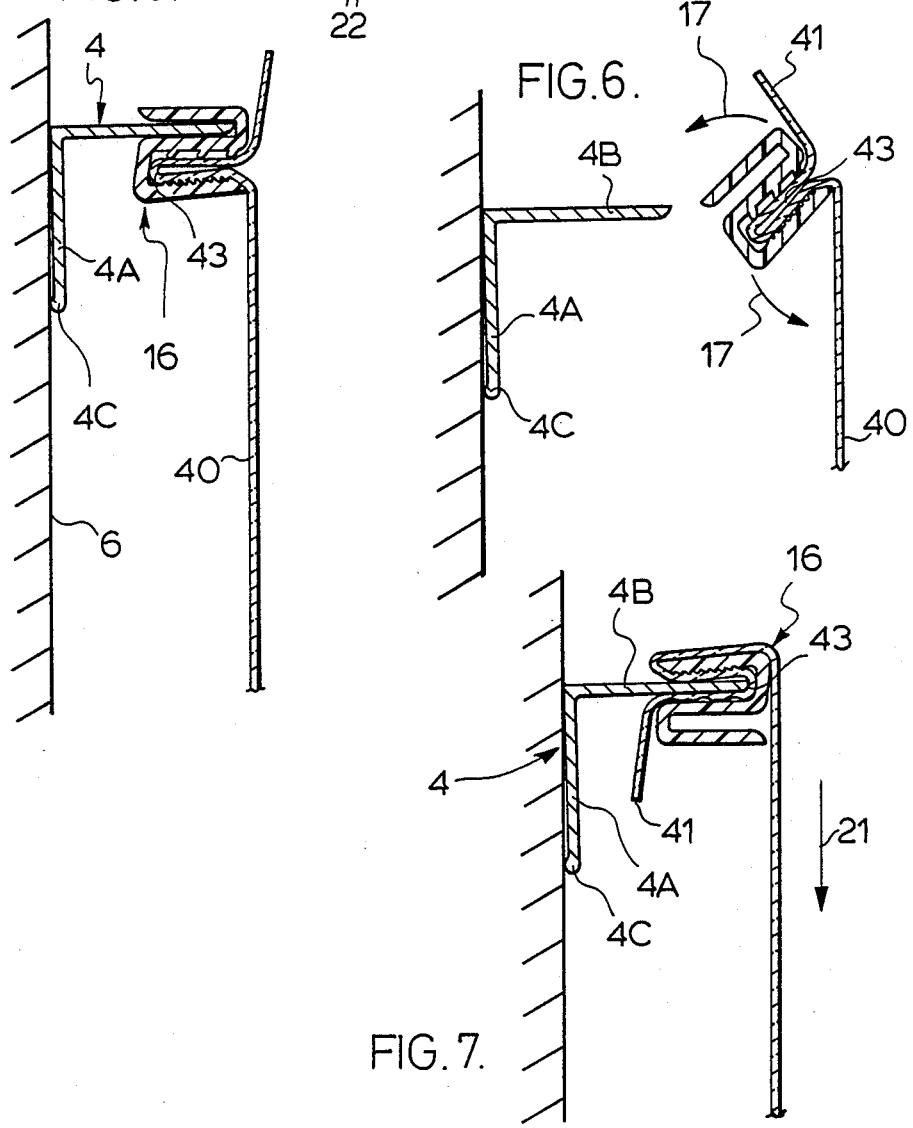

FABRIC MOUNTING SYSTEM

BACKGROUND OF THE INVENTION

The present invention relates to fabric mounting systems and particularly relates to a mounting for securing a fabric spaced one-half to two inches from a support surface.

In the past, fabric has been mounted to a wall merely by adhesively securing the fabric to a wall or mechanically securing the fabric to a wooden frame using nails or staples, however these arrangements suffer from problems associated with mounting of the fabric and/or the quality of the finished product in that welting of the fabric and/or tearing of the fabric occurs. In systems of this type, one is not only concerned with the initial mounting of the fabric, but also the subsequent capability to remove the fabric, if necessary, for example to clean the same. Fabric walls or partitions are popular in architecturally designed installations and therefore the quality of the mounting system must be such to ensure a relatively tight, wrinkle-free finish while still being convenient to install and economical.

One system presently being used is generally shown in U.S. Pat. No. 4,549,334 which issued to Lloyd Miller of Huntington Beach, CA. In this system a mounting track is secured to the wall and a hinge locking plate, having a number of projections or lancings thereon, pass through the fabric to positively lock the fabric to the hinge plate. The hinge plate then hinges relative to the mounting trace and locks with the same.

Other systems are known which adhesively secure to the fabric, with this member then force fitted into a slot or like structure. According to a further system, the fabric is secured much in the manner of a screen in a door. The fabric is forced into a slot and a resilient member is subsequently pressed into the slot to thereby lock the fabric. The fabric is then trimmed to remove the excess adjacent the edges.

There remains a need to provide a simple method of mounting a fabric to a wall or generally planar support surface which is easy to use and relatively inexpensive to produce. The system should provide sufficient flexibility for adjustment in the field, to accommodate minor variation in dimension from those initially anticipated and/or stretching of the fabric or cloth, and permit easy removal of the fabric for cleaning and/or replacement.

SUMMARY OF THE INVENTION

According to the present invention, a fabric mounting system comprises a mounting member having means for securing the mounting member to a wall or like support. The mounting member presents a generally planar mounting edge offset from the securing portion. A fabric engaging strip has a slot running the length thereof into which fabric is inserted. The fabric engaging strip, after receipt of the fabric within the slot, is then inserted over the mounting edge to firmly engage and retain the fabric in the slot due to the slight interference fit of the fabric and mounting edge in the slot. Preferably, the fabric is partially rolled about the fabric engaging strip such that the raw edge of the fabric is interior to the periphery of the system and the strip is covered by the fabric.

According to an aspect of the invention, the strip includes a further slot for initially positioning the fabric engaging strip on said mounting edge in a manner to allow insertion of the fabric into the slot to facilitate draping and fitting of the fabric. The strip and fabric are subsequently removed from the mounting edge and the strip is rotated about its longitudinal axis about 180° to effect securing of said strip and fabric by inserting the mounting edge into the slot already containing a fold of fabric.

The fabric engaging strip is preferably of a section to define two generally 'U' shaped slots opening in opposite directions, with each of the slots having a common sidewall. The one slot is sized to releasably engage the mounting edge in order to allow insertion of the fabric into the strip, with the second slot being sized to provide a slight interference fit with a fold of fabric inserted in the slot and the mounting edge inserted in the slot. This fabric slot preferably is of decreasing width from the bottom of the slot to the open mouth to provide a pinching action at the mouth of the slot.

BRIEF DESCRIPTION OF THE DRAWINGS

Preferred embodiments of the invention are shown in the drawings wherein,

FIG. 1 is a partial perspective view of two walls to which the length of fabric has been secured;

FIG. 2 is a partial perspective view of the mounting member to be secured to a wall or like support surface;

FIG. 3 is a side view of the mounting member secured to a wall;

FIG. 4 is a partial perspective view of the fabric engaging strip;

FIGS. 5, 6 and 7 are side elevations showing the various steps required in securing of the top edge of fabric to a horizontally disposed mounting member;

DETAILED DESCRIPTION OF THE EMBODIMENTS

Figure 8:
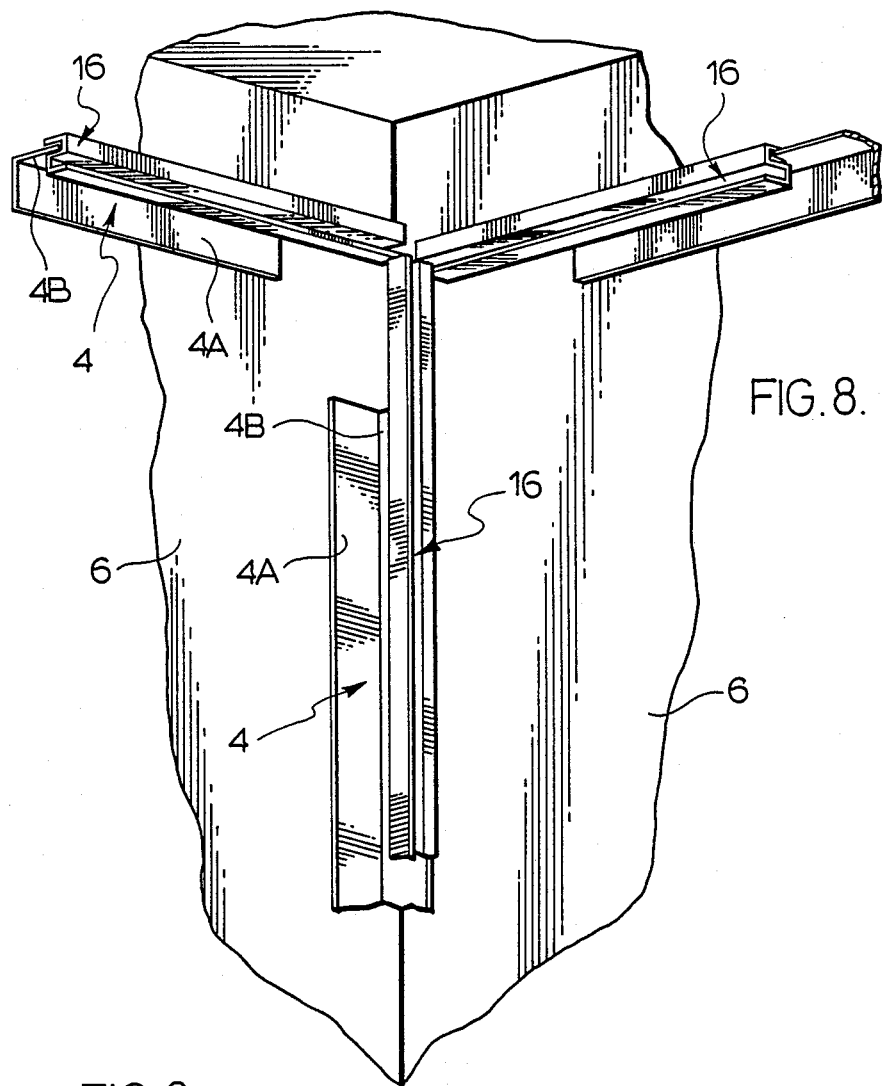
FIG. 8 is a partial perspective view showing various mounting strips secured on the mounting members at a corner securement.

The fabric mounting system generally shown as 2 in FIG. 1 includes mounting members 4 having a securing portion 4A for engagement with a wall or like support surface and a proud mounting edge 4B. The various mounting members 4 are secured to a wall or like structure generally shown as 6 in preparation for mounting of the fabric cover or partition 40. As can be seen, the mounting member spaces the fabric from the wall, preferably one-half to two inches, and as such, a noise dampening member, generally shown as 42 in FIG. 1, may be secured interior to the fabric partition if desired. The mounting member 4 includes a bead 4C at the free end of foot portion 4A to position the mounting edge 4B at an angle slightly greater than perpendicular relative to the wall 6. The tension applied by the fabric to the mounting member will cause a slight bending or deflection of the mounting edge 4B as shown in dotted lines in FIG. 3. The bead 4C compensates for the deflection produced due to the tensioning force indicated by arrow 5.

The fabric engaging strip generally shown as 16 in FIG. 4 includes a first slot 18 of generally 'U' shaped cross section preferably having decreasing width from the bottom of the slot to the mouth of the slot generally indicated as 19. The sides of this 'U' shaped slot 18 include locking teeth or ridges 22 for engaging the fabric as well as opposed resiliently deformable ribs indicated as 20. In back to back relationship with slot 18 is a further slot 24, again of generally 'U' shaped cross section, and opening in a direction opposite slot 18. These slots share a common side wall therebetween and the slots run in the length of the fabric engaging strip 18. Slot 24 as indicated in FIG. 5 forms a first or initial securing of the strip 16 to the mounting member 4 to facilitate insertion of the fabric 40 into slot 18 through the slot mouth 19. Due to the fit and the slightly narrow mouth 19, a tool or other device may be used for inserting the fabric into the slot to achieve the relationship as generally shown in FIGS. 5 and 6. With the fabric so inserted, the strip 16 may be removed from the mounting edge 4B as shown in FIG. 6, with the strip then rotated through a 180° as indicated by the arrows 17. The raw edge 41 of the fabric 40 will end up interior to the fabric mounting system as generally shown in FIG. 7 with a fold 43 of fabric 40 in slot 18. After the strip has been rotated, in this case, through 180°, slot 18 is then generally opposite the mounting edge 4B whereby the fabric engaging strip and fabric may be secured to the mounting member 4 by inserting the mounting edge 4B into the slot 18 with the fold 43 of fabric intermediate the fabric engaging strip 16 and the mounting edge 4B. The resilient ribs 20 ensure a good squeeze contact of the fabric within the slot 18 and the overlapping path of the fabric about an outer edge of the strip 16 and through the slot 18 firmly locks the fabric relative to the mounting member 4. The tensioning force that is applied to the fabric to provide a flat, flush finish is indicated by arrow 21. The relationship of the slot 18 and mounting member 4 and the fold of fabric is such that the fabric does not slip when so tensioned.

In addition, a slight tensioning of the fabric is possible due to the rotation of the mounting strip through its 180° rotation and this provides a simple method of tensioning of the fabric.

One of the advantages of the present system can be appreciated from a review of FIG. 8 where various mounting members have been secured to adjacent walls at a corner. The mounting members do not extend fully into the corner as it has been found that the securement of the fabric within the slot 18 is sufficient to retain the fabric at the corners. In this way, excess material resulting from folds in a fabric resulting from the corner transition, is accommodated within the system and furthermore, precision with respect to miter junctions between mounting members is not required. The strips 16 do substantially extend to the corner, however these too do not require a miter relationship. In this system, the mounting members can be as far as about two inches away from the corner and this greatly simplifies the initial cutting and securing of the mounting members 4 to the wall.

Figure 9:
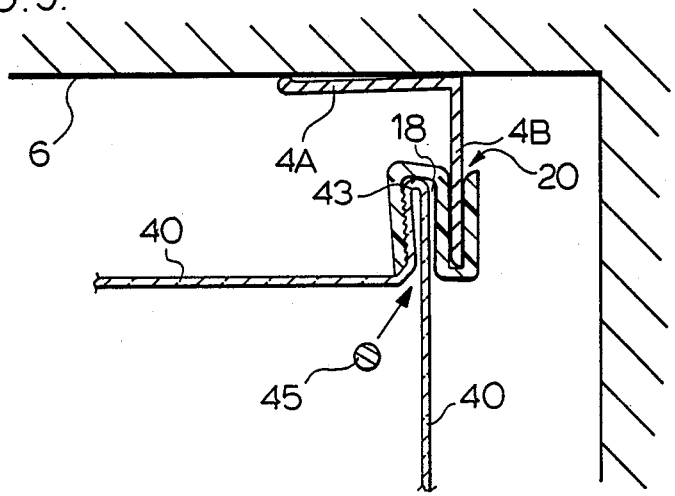
FIG. 9 is a top view showing a method of securing the fabric to a corner mounting member whereby the length of fabric need not be interrupted.

In FIG. 9, a variation is shown where the fabric engaging strip 16 has not been rotated through its 180° as the fabric 40 continues along the second wall. In this way, the fabric is not cut or interrupted and the corner securement of the fabric is accomplished intermediate its length. In order to ensure a firm fit of the fabric within the slot 18, a resilient strip member 45 is inserted into the fold of fabric located within the slot 18. This will serve to provide a good interference fit between the fabric 40 and slot 18.

It is preferred that the mounting members 4B be made of a metal extrusion and of the generally 'L' shaped section shown, however it can be appreciated other cross sections can be used. Aluminum extrusions or aluminum alloy extrusions are certainly acceptable and some plastic extrusions may be acceptable if they meet the required building and fire codes. The fabric engaging strip 16 is preferably made of a plastic material and produced by co-extrusion whereby the resilient ribs 20 can be formed on the fabric engaging strip and be of a more resilient material. In other cases, the strip could be made of the same material. The strip 16 is quite resilient and allows a rotational twist about the longitudinal axis to accommodate a 180° rotation in a length of about four feet or less without breakage or substantial plastic deformation thereof. The fabric engaging strip may be mounted as shown in FIG. 5 to receive the fabric in slot 18, whereafter the mounting strip may be progressively removed from the edge whereby a portion of the strip is still in engagement with the mounting edge 4B while another portion of the strip has been rotated through 180° and brought into engagement with mounting edge 4B. Therefore, an installer may partially remove the mounting strip and rotate the same 180° and resecure the strip to the mounting edge. The installer can then move along the strip and progressively, or in stages, rotate the remaining portion of the strip. Thus, the entire strip need not be rotated and resecured in a single step. In installing systems, a wall may be quite long and therefore this ability to remove a portion of the strip, rotate it 180° and then secure it is of benefit as one person, or certainly two people, can progressively move down the wall and need not rotate the entire edge in a single rotational step. Although this progressive securement of the strip and fabric is desirable, the entire strip and fabric could be rotated as a unit if desired. Therefore, the resiliency of the strip provides for two different methods available to the installer. Additional flexibility in the strip 16 is possible by providing slots generally perpendicular to the length thereof if desired. Such a modified strip may prove advantageous for forming a curved wall or partition.

Although the fabric engaging strip has been shown having two back to back 'U' shaped slots opening in opposite directions, this is the preferred embodiment and other variations are possible. In general, and according to our preferred embodiment, there is a first mounting arrangement to allow placement of the strip on the mounting edge 4B in a manner to present easy insertion of the fabric into the slot 18, whereafter the strip may be removed and rotated for final securement with the mounting edge 4B forced into slot 18 having the fold of fabric already therein.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A fabric mounting system comprising a mounting member having means for securing said mounting member to a wall or like support, said mounting member presenting a generally planar mounting edge offset from said securing means,
   a fabric engaging strip adapted to be retained by said mounting edge in one of two orientations,
   said fabric engaging strip in one of said two orientations being releasably supported by said mounting edge and presenting an elongate slot running generally parallel to said mounting edge and in close proximity thereto into which fabric is inserted, and in a second orientation which requires rotation of said strip about a longitudinal axis thereof from said first position, said mounting edge being received in said elongate slot trapping said fabric between said strip and said mounting edge, said fabric engaging strip receiving said fabric within said slot in said first orientation and in said second orientation cooperating with said mounting edge to firmly engage and retain said fabric in said slot by the receipt of said mounting edge in said slot, to define a fabric edge portion exterior to said strip covering one side of said strip, said fabric edge portion merging with a fabric face portion crossing said strip to effectively conceal said strip by placing the strip interior to said fabric edge portion and intermediate said fabric face portion and said mounting member.

2. A fabric mounting system as claimed in claim 1, wherein said fabric engaging strip is sized to receive a fold of said fabric and said mounting edge is received within the fold of fabric.

3. A fabric mounting system as claimed in claim 2, wherein said fabric engaging strip is retained by said planar mounting edge by means of mounting means on said fabric engaging strip sized to engage said mounting edge and orientate said slot in a manner to facilitate insertion of said fabric in said slot in preparation for retention by receiving said mounting edge in said slot.

4. A fabric mounting system as claimed in claim 3, wherein said strip includes resilient deforming ribs interior to said slot and generally extending in the length of the strip.

5. A fabric mounting system as claimed in claim 4, wherein said slot is generally 'U' shaped with one side of the slot having said deforming ribs and the opposite side of the slot having a notched surface for retaining fabric under tension when in engagement with said mounting edge.

6. A fabric mounting system as claimed in claim 5, wherein said strip is made by a co-extrusion process.

7. A fabric mounting system as claimed in claim 6, wherein said strip is at least primarily of a plastic material.

8. A fabric mounting system as claimed in claim 5, wherein said strip is sufficiently resilient to accommodate a 180° rotational twist about its longitudinal axis in a length of about four feet or less.

9. A fabric mounting system comprising a mounting member having means for securing said mounting member to a wall or like support, said mounting member presenting a generally planar mounting edge offset from said securing means, a fabric and a fabric engaging strip, said fabric engaging strip having a first slot running the length thereof into which fabric is inserted, said fabric engaging strip receiving said fabric within said first slot and cooperating with said mounting edge to firmly engage and retain said fabric in said first slot by the receipt of said mounting edge in said first slot, said fabric being partially wrapped about said strip to conceal the strip intermediate the mounting member and said fabric, and wherein said strip has a second slot opening oppositely to said first slot, said second slot being on said mounting edge to position said strip for inserting fabric into said fabric receiving slot in preparation for said mounting edge firmly engaging said fabric when said strip has received said fabric and said mounting edge has been received in said first slot.

10. A fabric mounting system as claimed in claim 9, wherein said slots are in back to back relation and have a common sidewall.

11. A fabric mounting system as claimed in claim 10, wherein first slot is of decreasing width from bottom to the mouth of the slot.

12. A fabric mounting system as claimed in claim 11, wherein said mounting member is generally 'L' shaped in cross section.

13. A fabric mounting system as claimed in claim 12, wherein said mounting member is a metal extrusion.

14. In a fabric mounting system, a mounting edge, a fabric and a fabric engaging strip component for cooperating with said mounting edge, said fabric engaging strip component comprising a generally 'U' shaped fabric engaging slot extending the length of the component and means interior to the slot and disposed on a sidewall thereof to cooperate with said fabric inserted in said slot to lock the same when both are brought into engagement with said mounting edge, wherein said fabric engaging component has separate slot like mounting means disposed exterior to said slot and opening in a direction generally opposite said slot, said separate slot like mounting means when inserted on said mounting edge releasably securing said fabric engaging strip component and presenting said slot immediately adjacent said mounting edge and in a manner to facilitate insertion of said fabric into said slot in a preparation for final securement of said fabric and said fabric engaging strip component on said mounting edge by insertion of said mounting edge within said slot.

15. In a fabric mounting system as claimed in claim 14, wherein said separate slot like mounting means is an oppositely disposed 'U' shaped slot opening in a direction opposite to said fabric engaging slot and having a common side therewith.

16. In a fabric mounting system as claimed in claim 15, wherein said fabric engaging component is sufficiently resilient to accommodate a 180° rotational twist in a length of about four feet or less without breakage or substantial plastic deformation.

17. In a fabric mounting system as claimed in claim 14, wherein said fabric engaging component cooperates with a mounting bracket securable to a wall or other support surface, said mounting bracket presenting a mounting edge generally perpendicular to the wall.

18. In a fabric mounting system, a fabric, a support member and a fabric engaging member which define an arrangement for securing said fabric to said support member, said fabric engaging member including a fabric engaging recess running the length of said member for receiving a fold of said fabric therewithin as well as mounting portion of said support member and a separate means integral with said fabric engaging member and adjacent said fabric engaging recess for positioning said fabric engaging member on said mounting portion of support member to present said fabric engaging member for the receipt of fabric in said fabric engaging recess whereafter said fabric engaging member and said fold of fabric are mounted on said support member by receiving said mounting portion in said fold.

19. A fabric mounting system comprising a mounting member having means for securing said mounting member to a wall or like support, said mounting member including a mounting edge for cooperating with a fabric engaging strip, said edge portion being spaced outwardly from such wall or like support; a fabric engaging strip adapted to be retained by said edge portion in one of two orientations, said fabric engaging strip in one of said two orientations being releasably supported by said mounting edge and presenting an elongate slot running generally parallel to said mounting edge and in close proximity thereto into which fabric is inserted, and
   in a second orientation which requires rotation of said strip about a longitudinal axis thereof from said first position, said mounting edge being received in said elongate slot trapping said fabric between said strip and said mounting edge.

20. In combination, a fabric mounting system and a fabric,
said mounting system including fabric retaining strips and cooperating mounting members,
each mounting member including a mounting edge projecting from a base portion secured to a wall like support and each strip having an elongate slot with a portion of fabric received in said slot with said mounting edge being received in said slot to retain the fabric, said fabric exterior to said strip being trained about the strip to define a fabric edge portion exterior to said strip covering one side of said strip, said fabric edge portion merging with a fabric face portion crossing said strip to effectively conceal said strip by placing the strip interior to said fabric edge portion and intermediate said fabric face portion and said mounting member,
   said fabric retaining strip including mounting means sized for engagement with said mounting edge and positioned on said mounting edge to locate said fabric retaining slot such that said slot opens away from said mounting member and to locate said fabric retaining slot immediately adjacent said mounting edge when said mounting means is in engagement with said mounting edge.

* * * * *